Patented Jan. 9, 1951

2,537,030

UNITED STATES PATENT OFFICE 2,537,030

POLYMERIZATION PROCESS

David W. Chaney, Nether Providence Township, Delaware County, Pa., assignor to American Viscose Corporation, Wilmington, Del., a corporation of Delaware No Drawing. Application March 31, 1948, Serial No. 18,302

8 Claims. (Cl. 260—88.7)

This invention relates to the polymerization of certain polymerizable organic substances containing the vinyl ($CH_2=C<$) radical.

The usual processes for producing polymers from monomeric substances of the type mentioned, yield mixtures of high and low polymers. The mixtures are made up of fractions comprising extremely long polymeric chains and fractions comprising short chains. When the mixed products have a high overall molecular weight in the fiber-forming range, the number of excessively long chains comprising the product is high. Those mixed products do not always dissolve completely in the available solvents. For instance, it is often extremely difficult to obtain clear, homogeneous and stable spinning solutions of polyacrylonitrile produced by conventional polymerization processes. Usually, if the solutions are examined microscopically, minute particles or gels are observed. These undissolved particles are not dissolved even at greatly increased temperature, are not removed by filtering, and interfere with spinning operations. The presence of the undissolved particles or gels is particularly objectionable when it is desired to produce filaments of low denier per filament, using a spinneret having small orifices. This difficulty cannot be avoided, in the case of the polymers under consideration, by spinning the solutions through a spinneret having large orifices and then drawing the filaments down to smaller denier. The difficulties encountered due to incomplete dissolution of the polymers, and gelling, are believed to be directly attributable to the presence of the extremely long polymeric chains, as well as the possibility of cross-linking at the end of the polymerization reaction, when the monomer concentration is low and free radicals (active catalyst) tend to react with polymer chains.

The object of the present invention is to provide a simple, readily reproducible method for polymerizing the polymerizable organic vinyl-containing substances to produce polymers of any predetermined molecular weight, which does not vary excessively from the beginning to the end of the polymerization. Another object is to produce polymers comprising polymeric chains of uniform or almost uniform length. A further object is to provide a method of polymerizing monomeric substances of the type aforesaid, which does not involve an induction period, and by which polymers may be produced in an hour or less. Another object is to produce polymers, specifically polyacrylonitrile, of high molecular weight and soluble in available solvents at room temperature to produce clear, homogeneous solutions which are stable for prolonged periods of time.

I have found that polymers of the polymerizable organic substances mentioned above, having average molecular weights which do not vary excessively from the beginning to the end of the polymerization reaction, and comprising polymeric chains of uniform or almost uniform length, can be produced by the solution polymerization process only when the amount of monomer available for acceptance into the polymer molecule corresponds to the amount accepted at any given moment, under the given polymerization conditions. In solution polymerization, the reaction medium is a system having a single liquid phase.

Monomers of the type of acrylonitrile, for example, do not have an even rate of acceptance into the polymer molecule. That is, under a fixed set of polymerization conditions, the rate at which the monomer enters the polymer molecule varies, the monomer being accepted rapidly at one stage of the process, and slowly at another stage. This variation in the rate at which the monomer enters the polymer molecule is responsible for the production of high and low polymers in admixture.

To overcome this difficulty, it is necessary to replenish the monomer consumed in the reaction at a rate corresponding to the rate of consumption at any given moment.

The art does not disclose any method by which this may be accomplished.

U. S. 2,404,716 discloses a method of polymerizing acrylonitrile wherein the monomer is added slowly to water over a period of two hours at a fixed polymerization temperature. The patent does not state the exact rate of the addition, or the effect of the rate of addition on the uniformity of the product. Only the average overall molecular weight of the polymer is given. Apparently, the monomer was added at an even uniform rate. The objects of the present invention cannot be achieved under those conditions. Since the overall rate of polymerization varies, the rate at which the monomer is added must also vary, and, as I have found, usually increases progressively as the polymerization proceeds, whether the polymerization is on a batch or continuous scale.

The objects of the present invention are accomplished by a new method of solution polymerization wherein the monomer is added continuously to a solvent therefor during the course of the polymerization, and the boiling point of the monomer-solvent mixture is utilized as a control for the rate at which the monomer is added to the solvent at any given moment during the reaction.

The invention takes advantage of the principle that a single phase mixture of liquids which are mutually soluble at the boiling point of the mixture has only one boiling point, and any change in the ratio of the liquids also effects a change in the boiling point of the mixture. Thus, when a liquid monomer in solution in a solvent therefor is removed from solution as a result of polymerization, while the solution is being heated at its boiling point, the monomer solvent ratio is altered. Alteration in the monomer ratio will automatically alter the boiling point of the remaining monomer-solvent solution. In the case of a solution of acrylonitrile in water, for example, as the acrylonitrile is removed from solution and accepted into the polymer molecule, the ratio of monomer to water decreases. The boiling point of the solution immediately rises to correspond to the new monomer-solvent ratio. Since any change in the boiling point of the solution of the two liquids indicates a change in the monomer-solvent ratio, the boiling point can be used as a criterion of the concentration of monomer present at any given moment. In order to control the monomer-solvent ratio to produce uniform polymers, therefore, I conduct the polymerization under reflux, and add the monomer to the solvent at a rate which is so continuously adjusted and correlated to the temperature of reflux, that the temperature of reflux remains substantially constant from the beginning to the end of the reaction.

The method of the invention can be used for the polymerization of any polymerizable organic substance containing the vinyl radical which, under the given pressure conditions is mutually soluble with the selected solvent, in concentrations of at least 1% at a temperature below the boiling points of the solvent and monomer. The pressure may be atmospheric, reduced or increased pressure. Preferably, the polymerizable substance is soluble in water in concentrations of at least 1 to 15% to form liquid monomer solutions in water having a boiling point of from 75 to 95° C., and the polymerization is performed at a temperature of from 75 to 95° C. Important examples of such monomers are acrylonitrile, the acrylates, such as methyl acrylate, the methacrylates, such as methyl methacrylate, 2-vinyl pyridine, 4-vinyl pyridine, etc.

In carrying out the invention, the desired amount of water, which may or may not contain a small quantity of a wetting agent for increasing the water-solubility of the monomer, is placed in a reflux apparatus. The monomer is then added to the water in an amount sufficient to initiate refluxing at a temperature of from 75 to 95° C., heat being applied from an external source. As soon as refluxing has commenced, a solution of an appropriate catalyst is added. The concentration of the monomer decreases, as it is accepted into the polymer molecule, and when this occurs the temperature of reflux tends to rise. In order to prevent such increase in the temperature of reflux, addition of the monomer is begun and continued at a rate such that the temperature of reflux remains unchanged, until the solids content of the vessel is such that further polymerization is impractical, when the process is quickly terminated.

It is not possible to state the rate at which the monomer must be added at any given moment to maintain the monomer-solvent ratio constant at the selected temperature in the range indicated, since the monomers mentioned exhibit differences in the rate at which they are accepted into the polymer molecule. The rule is that if the heat available is such as to normally maintain the solution at the selected temperature of from 75 to 95° C., any increase or decrease in the temperature of the liquid is compensated by increasing or decreasing the rate at which the monomer is added, until the system is again at equilibrium. The rate at which the monomer must be added may increase or decrease at different stages of the reaction, depending upon whether the boiling point tends to increase or decrease.

When all of the monomer has been added, the reaction is terminated by adding an inhibitor to "kill" the catalyst, by filtering off the reaction product and rapidly washing it, or by pouring the reaction mixture into a large volume of cold water. However the reaction is terminated, the catalyst must be "killed" or removed quickly, not only to prevent variations in molecular weight but also to eliminate the possibility of cross-linking reactions which tend to take place when active catalyst (free radicals) and polymer molecules are present and monomer concentration is very low.

The molecular weight of the polymer obtained depends upon the concentration of catalyst present and the actual temperature within the range 75 to 95° C. employed. Increasing or decreasing the catalyst concentration, or increasing or decreasing the temperature in the range stated, decreases or increases the molecular weight of the polymer. This interdependence of the catalyst concentration and polymerization temperature in controlling the actual molecular weight of the polymer is, of course, known as a general proposition. The present invention provides polymers which are of uniform or nearly uniform molecular weight throughout, regardless of what the overall molecular weight may be in any given case. By variation of catalyst concentration and/or temperature, any average degree of polymerization from 100 to 10,000 (represented in the case of acrylonitrile polymers by specific viscosities in dimethyl formamide of from 0.03 to 3.0) can be obtained. Preferably, the catalyst is present in a concentration of from about 0.5 to 10.0 gms./liter of water, and, in any case, the catalyst must be present in a concentration such that the generation of free radicals or initiators does not fall off appreciably during the reaction. Catalysts which may be used are of the water-soluble type, such catalysts being exemplified in per-salts of the type of potassium persulfate, ammonium persulfate, and sodium perborate.

So-called activators of the type of sodium bisulfate may be added to the solvent at the start of operations, if desired.

If desired, small amounts of wetting agents may be added to the water, at the start of operations. The wetting agents which may be used include organic alkali metal sulfates and sulfonates, higher fatty esters, amides, and ethers or groups bearing sulfate and sulfonic groups, aromatic and alkylated aromatic sulfonates, and the like. Fatty acid alkali metal soaps may also be used.

When the polymerization is conducted under the conditions described, the instantaneous molecular weight, that is, the molecular weight of the polymeric chains formed at any given instant during the course of the reaction varies within a comparatively narrow range, as indicated by the specific viscosity of samples removed at intervals during the reaction. The specific viscosities of the samples vary over a very small range, usually within the range 0.1 to 0.01 as determined by Staudinger's formulation. These specific viscosities, which are a measurement of the molecular weights, indicate that the polymeric chains formed throughout the entire course of the reaction are of substantially uniform length. Polymers having high molecular weights in the fiber-forming range may be obtained. the polymers comprising polymeric chains which are of medium length, and the chain length is substantially constant at all portions of the polymer. These polymers of uniform molecular weight and chain length throughout dissolve in available solvents to yield clear homogeneous solutions which have less tendency to form gels on standing than do the mixed polymers obtained by the usual solution polymerization processes. The solutions of the uniform polymers do not contain suspended undissolved particles, as evidenced by microscopic examination. Polyacrylonitrile produced in accordance with this invention and having an overall molecular weight between 500 to 500,000 can be dissolved at room temperature in dimethyl formamide without difficulty, to form clear, stable solutions which are free of suspended particles, and which do not gel when allowed to stand at room temperature for a long period of time.

The method of this invention is well adapted to polymerization of the organic polymerizable substances containing the vinyl group on a continuous scale. Thus, the polymer may be withdrawn from the apparatus at the same rate as it is formed, while the monomer addition is maintained continuous and correlated with the temperature of reflux. Any water or catalyst removed with the polymer may be compensated for by the addition of corresponding amounts of water and catalyst to the reaction vessel.

An outstanding feature of the invention is that the method does not involve an induction period, and the polymer is produced in an hour or less, and frequently in from 20 to 30 minutes. This is in contrast to conventional solution and bulk polymerization procedures which involve a long induction period and require 24 hours or longer for polymer formation.

The following examples are given to illustrate the invention, which is not, however, limited to the specific examples shown.

Example I 108 parts of acrylonitrile and 2950 parts of water were heated to 85° C. with stirring, in a three-necked vessel equipped with a stirrer, thermometer, reflux condenser, and addition funnel. 2.16 parts of potassium sulfate dissolved in 50 parts of water and heated to 85° C. were added. As soon as polymerization and reflux set in, the addition of acrylonitrile was started. Over a period of 27 minutes, 108 parts of acrylonitrile were added continuously to the reaction at a rate such that the reflux temperature was held at 85° C. The rate of addition of the monomer, and the specific viscosities of samples of polymer removed from the reaction vessel at various stages of the reaction are set forth in the table below:

| Rate of Addition of Monomer, parts/min. | Per Cent Reaction | Specific Viscosity |
|---|---|---|
| 2.2 | 20 | .321 |
| 2.4 | 30 | .344 |
| 2.8 | 50 | .354 |
| 3.4 | 70 | .385 |
| 4.4 | 80 | .378 |
| 4.9 | 90 | .425 |
| 5.3 | 100 | .404 |

The reaction was complete in 27 minutes.

Example II 108 parts of methyl acrylate in 2950 parts of water were heated to 80° C. (where refluxing began) in a three-neck flask equipped with stirrer, thermometer, reflux condenser and addition funnel. 2.16 parts of potassium persulfate dissolved in 50 parts of water were then added. 108 parts of methyl acrylate were added continuously to maintain the temperature and rate of reflux unchanged. The addition was complete in twenty minutes.

| Rate of Addition of Monomer, parts/min. | Per Cent Reaction | Specific Viscosity |
|---|---|---|
| 7.5 | 20 | .236 |
| 8.6 | 60 | .231 |
| 8.8 | 80 | .217 |
|  | 100 | .226 |

The latex was coagulated by addition of sodium chloride, washed with water, purified for analysis by dissolving in acetone and filtered.

Polymers of these vinyl-containing materials, having the same or about the same viscosities from the beginning to the end of the polymerization can not be produced by the known suspension polymerization process. Suspension polymerization is performed in a two-phase system. Samples of polyacrylonitrile removed from a suspension polymerization bath at different stages of polymerization were found to have viscosities varying over a range of from 0.6 to 2.9, indicating that the final product comprised a mixture of high and low polymers having non-uniform molecular weights and chains lengths. The suspension polymerization process has the additional disadvantage that it requires the use of stabilizers which maintain a small particle size and prevent coagulation on the stirring device, on the walls of the reaction vessel, etc., which stabilizers have to be removed at the end of the polymerization reaction.

It will be understood that modification may be made in the invention as described in detail in the examples. For instance, variations may be made in the temperature of polymerization, the monomer polymerized, and the type and concentration of the catalyst. Such modifications may be made without departing from the spirit and scope of the invention as defined in the appended claims.

I claim:

1. In the polymerization of organic polymerizable liquid monomers, which contain the group $CH_2=C<$ and are soluble in water in concentrations of at least 1% to form an aqueous solution having a boiling point below the boiling point of water and that of the monomer under the pressure existing during the polymerization, in solution in wated in the presence of a water-soluble polymerization catalyst, the improvement which comprises initiating the polymerization in a single liquid-phase system comprising an aqueous solution of a polymerizable material consisting of only one such monomer under reflux, and continuously adding the monomer to the aqueous solution at the reflux temperature at a rate which maintains the temperature of reflux substantially constant throughout the polymerization reaction.

2. The method of polymerizing organic polymerizable liquid monomers, which contain the group $CH_2=C<$ and are mutually soluble in water in concentrations of at least 1 to 15% to form an aqueous solution having a boiling point below the boiling point of water and that of the monomer under the pressure existing during the polymerization, in a single liquid-phase system, which comprises adding a predetermined proportion of a polymerizable material consisting of only one such monomer to water, bringing the solution to reflux temperature, adding a water-soluble polymerization catalyst to the solution at the reflux temperature, and thereafter continuously adding the monomer to the aqueous solution at the reflux temperature at a rate which maintains the temperature of reflux substantially constant throughout the polymerization reaction.

3. The method of claim 2 wherein the monomer is an acrylic acid derivative.

4. The method of claim 2 wherein the monomer is acrylonitrile.

5. The method of claim 2 wherein the monomer is methyl acrylate.

6. The method of claim 2 wherein an aqueous solution of the water-soluble polymerization catalyst is at approximately the temperature of reflux when it is added to the aqueous solution of the monomer at the temperature of reflux.

7. In a method of polymerizing organic polymerizable liquid monomers, which contain the group $CH_2=C<$ and are mutually soluble with water at a temperature between 75° C. and 95° C. in concentrations of at least 1% to 15% to form an aqueous solution having a boiling point between 75° C. and 95° C., in solution in water in the presence of a water-soluble polymerization catalyst, the improvement which comprises initiating the polymerization in a single liquid-phase system comprsing an aqueous solution of a polymerizable material consisting of only one such monomer under reflux at a temperature between 75° C. and 95° C., and continuously adding the monomer to the aqueous solution at the reflux temperature at a rate which maintains the reflux temperature substantially constant throughout the polymerization reaction.

8. The method of polymerizing organic polymerizable liquid monomers which contain the group $CH_2=C<$ and are mutually soluble with water in concentrations of at least 1% to 15% to form an aqueous solution having a boiling point below the boiling point of water and that of the monomer under the pressure existing during the polymerization, in a single liquid-phase system, which comprises adding a predetermined proportion of a polymerizable material consisting of only one such monomer to water, bringing the solution to reflux temperature, adding a water soluble polymerization catalyst to the solution at the reflux temperature, thereafter continuously adding the monomer to the aqueous solution at the reflux temperature at a rate which maintains the temperature of reflux substantially constant throughout the polymerization reaction, and continuously withdrawing the polymer at the rate at which it is formed in the reaction.

DAVID W. CHANEY.

REFERENCES CITED

The following references are of record in the file of this patent:

UNITED STATES PATENTS

| Number | Name | Date |
|---|---|---|
| 2,420,330 | Shriver et al. | May 13, 1947 |